Patented Nov. 10, 1936

2,060,428

UNITED STATES PATENT OFFICE 2,060,428

NITRO-PHENYL-ARYLENE-THIAZYL-DISUL-PHIDES AND PROCESS OF MANUFACTURING THE SAME

Winfield Scott, Nitro, W. Va., assignor, by mesne assignments, to Monsanto Chemical Company, St. Louis, Mo., a corporation of Delaware No Drawing. Application September 14, 1929, Serial No. 392,732

14 Claims. (Cl. 260—16)

The present invention relates to new chemical substances comprising reaction products obtained by reacting a mercapto-aryl thiazole or a metallic salt thereof with a mononitro or a mononitro and halogen substituted derivative of an aryl sulphur halide, which reaction products may be conveniently called the mononitro aryl-aryl thiazyl disulphides. The invention also comprises the process of manufacturing such products.

One of the preferred new compounds, namely, 2-nitro-phenyl benzo-thiazyl disulphide was prepared as follows: Mercapto-benzo-thiazole and an excess of a caustic alkali, for example potassium hydroxide, were dissolved in alcohol, whereby an alcoholic solution of potassium mercapto-benzo-thiazole was obtained. Approximately an equivalent quantity of ortho-nitro-phenyl sulphur chloride was added slowly thereto at room temperature, with stirring. A finely divided yellow powder was formed which was filtered from the liquid, the product washed with water to remove the alkali salt present and dried. The product was further purified by recrystallization from an organic solvent, preferably from chloroform.

The reaction whereby 2-nitro-phenyl benzo-thiazyl disulphide was prepared is illustrated as follows:

pleted. The mixture was filtered to remove the sodium chloride formed, and the solvent removed, for example by evaporation. A brown syrup was obtained which formed a yellow solid on cooling. The product was further purified by recrystallization from an organic solvent, for example ethyl acetate.

Another example of the preferred class of compounds comprises the reaction product of the sodium salt of 6-nitro, 2-mercapto-benzo-thiazole and ortho-nitro-phenyl sulphur chloride which was prepared as follows:

Approximately 21.2 parts by weight of 6-nitro, 2-mercapto-benzo-thiazole (0.1 mol.) and 6 parts by weight of sodium carbonate were dissolved in boiling ethyl alcohol, and approximately 18.9 parts by weight of ortho-nitro-phenyl sulphur chloride (0.1 mol.) were added thereto with agitation. A yellow precipitate separated, which was filtered while hot, washed first with alcohol then with water and dried. This crude product was purified preferably by recrystallization from an organic solvent, for example chlorbenzene, from which it separated in yellow needles. This product, which may be termed 2-nitro-phenyl, 6-nitro-benzo-thiazyl-disulphide, was prepared according to the following equation.

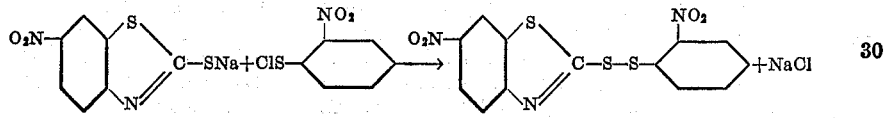

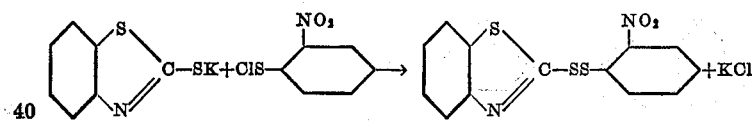

As another method of preparing the preferred new class of compounds, the following is given.

Another of the preferred class of compounds, namely, 2-nitro, 4-chlor-phenyl, 6-methyl-benzo-thiazyl-disulphide, was prepared according to the following equation:

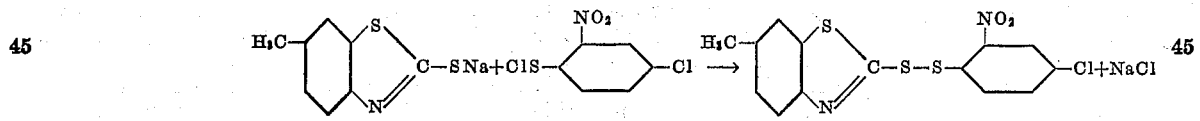

To ortho nitro phenyl sulphur chloride dissolved in an organic solvent, for example carbon tetrachloride, an approximately equimolecular proportion of mercapto-benzo-thiazole, followed by a slight excess of dry sodium carbonate was added. After heating for substantially one-half an hour on the steam bath, the reaction was completed.

wherein substantially 18.1 parts by weight of 6-methyl, 2-mercapto-benzo-thiazole (0.1 mol.) and substantially 6 parts by weight of sodium carbonate were heated in boiling alcohol until solution was practically completed, after which substantially 22.4 parts by weight of 2-nitro, 4-chloro-phenyl sulphur chloride (0.1 mol.) were added thereto, with agitation. A vigorous reaction resulted. The mixture was digested on a

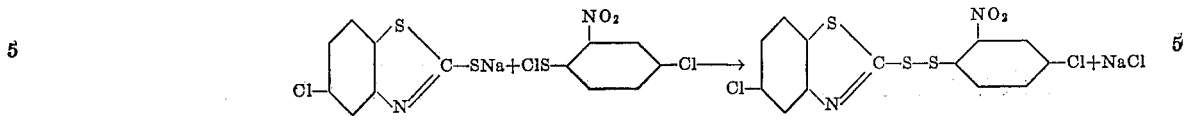

steam bath for about one-half an hour, after which the yellow solid reaction product was filtered off, washed with alcohol and water, dried and purified, preferably by recrystallization from an organic solvent, for example glacial acetic acid.

The sodium salt of 6-nitro, 2-mercapto-benzothiazole, has been reacted with 2-nitro, 4-chloro-phenyl sulphur chloride according to the following equation

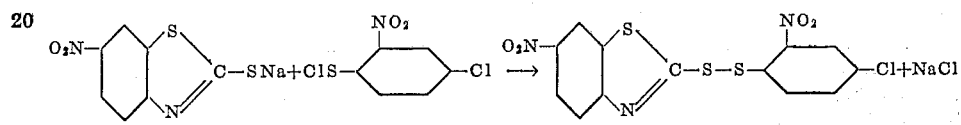

to form 2-nitro, 4-chloro-phenyl, 6-nitro-benzothiazyl disulphide. Thus, substantially 21.2 parts by weight of 6-nitro 2-mercapto-benzo-thiazole (0.1 mol.) and approximately 6 parts by weight of sodium carbonate were heated in alcohol approximately at the boiling temperature until solution was practically completed, after which substantially 22.4 parts by weight of 2-nitro, 4-chloro-phenyl sulphur chloride were added to the hot solution with agitation. A vigorous reaction followed. The reaction mixture was digested on a steam bath for substantially one half an hour after which the yellow solid reaction product was filtered off, washed with alcohol and water and dried. This crude material was then purified preferably by recrystallizing from an organic solvent, for example acetone.

Another example of the new class of compounds is 2-nitro-phenyl, 5-chloro-benzo-thiazyl-disulphide which was prepared by reacting substantially equimolecular proportions of the sodium salt of 5-chlor, 2-mercapto-benzo-thiazole and ortho-nitro-phenyl sulphur chloride in a manner similar to that by which 2-nitro-phenyl, 6-nitro-benzo-thiazyl disulphide was prepared. The material thus formed was a yellow solid which was purified preferably by recrystallization from an organic solvent, for example chlorbenzene. The reaction involved in the preparation of this compound follows:

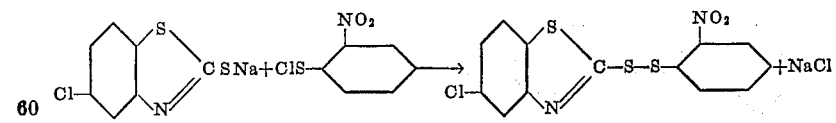

As a further example of the preferred new class of compounds, 2-nitro, 4-chloro-phenyl, 5-chloro-benzo-thiazyl disulphide was prepared by the reaction of substantially equimolecular proportions of the sodium salt of 5-chloro, 2-mercapto-benzo-thiazole and 2-nitro, 4-chloro-phenyl sulphur chloride in a manner analogous to that hereinbefore set forth by which 2-nitro-phenyl, 6-nitro-benzothiazole disulphide has been prepared. The yellow solid thus obtained was purified preferably by recrystallization from an organic solvent, for example nitro benzene.

The reaction involved in the preparation of 2-nitro, 4-chloro-phenyl, 5-chloro-benzo-thiazyl disulphide according to the method disclosed above, is as follows:

The new class of compounds as hereinbefore disclosed constitute an important group of rubber vulcanization accelerators which may be employed alone, but preferably are employed in conjunction with a basic organic nitrogen-containing activator accelerator, such for example as diphenyl-guanidine and the like.

Other nitro aryl derivatives of aryl thiazyl disulphides than those hereinbefore set forth may also be prepared conveniently by reacting a mercapto aryl thiazole or a metallic salt thereof, preferably dissolved in a solvent with a mono nitro aryl sulphur halide. The resulting product as has been shown by the various examples hereinbefore set forth comprises a derivative of a nitro phenyl thiazole containing the group

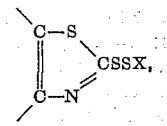

wherein X represents a phenyl or other aryl group containing a nitro group or a substituent thereof.

Having thus described the present invention what is claimed is:

1. As a new compound 2-nitro-phenyl benzothiazyl disulphide.

2. A method of making 2-nitro-phenyl benzothiazyl disulphide which comprises reacting in the presence of an organic solvent mercapto-benzo-thiazole, an alkali and ortho-nitro-phenyl-sulphur chloride, separating out the 2-nitrophenyl benzo-thiazyl disulphide and purifying it by recrystallization.

3. As a new compound, 2-nitrophenyl-6-nitro-benzo-thiazyl disulphide.

4. As a new compound, 2-nitrophenyl-5-chloro-benzo-thiazyl disulphide.

5. As new compounds the nitro phenyl-benzo-thiazyl-disulphides, said phenyl radical containing a nuclear halogen substituent.

6. As new compounds the mono nitro phenyl-benzo-thiazyl-disulphides, said phenyl radical containing a nuclear halogen substituent.

7. A method of making a nitro-phenyl-benzo-thiazyl-disulphide which comprises reacting a mercapto-benzo-thiazole with a nitro-phenyl sulphur chloride, said phenyl radical containing a nuclear halogen substituent, separating out the reaction product and purifying.

8. A method of making a nitro-phenyl-arylene-thiazyl-disulphide which comprises reacting a mercapto-arylene-thiazole, said arylene group

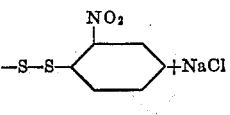

containing less than eight carbon atoms, with a nitro-phenyl sulphur halide, said phenyl radical containing a nuclear halogen substituent.

9. A 2-nitro phenyl benzo-thiazyl disulphide.

10. A method of making a 2-nitro phenyl benzo-thiazyl disulphide which comprises reacting a mercapto-benzo-thiazole with a 2-nitro phenyl sulphur halide and separating out the nitro phenyl benzo-thiazyl disulphide so produced.

11. Compounds of the structural formula

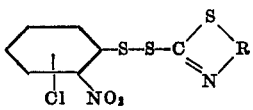

where R is an arylene group containing less than eight carbon atoms.

12. A method of manufacturing compounds of the structural formula

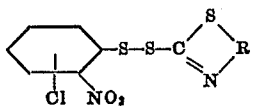

where R is an arylene group containing less than eight carbon atoms, which comprises reacting a halogen substituted 2-nitro-phenyl sulphur halide with a mercapto-arylene-thiazole containing less than eight carbon atoms.

13. A method of making a mono nitro phenyl-benzo-thiazyl disulphide which comprises reacting a mercapto-benzo-thiazole with a mono nitro-phenyl sulphur halide said phenyl radical containing a nuclear halogen substituent, separating out the reaction product and purifying it.

14. As new compounds nitro phenyl thiazyl disulphides of the structural formula

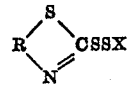

where R is an arylene group containing less than eight carbon atoms and X is a nitro phenyl group containing a halogen substituent.

WINFIELD SCOTT.